(12) United States Patent
Clute et al.

(10) Patent No.: US 8,584,980 B2
(45) Date of Patent: Nov. 19, 2013

(54) BELT RETRACTOR HAVING A FORCE LIMITATION DEVICE AND A TIGHTENING DEVICE

(75) Inventors: Günter Clute, Elmshorn (DE); Jon Burrow, Ortonville, MI (US)

(73) Assignee: Autoliv Development AB, Vargärda (SE)

( * ) Notice: Subject to any disclaimer, the term of this patent is extended or adjusted under 35 U.S.C. 154(b) by 261 days.

(21) Appl. No.: 13/127,557

(22) PCT Filed: Nov. 18, 2009

(86) PCT No.: PCT/EP2009/008190
§ 371 (c)(1),
(2), (4) Date: May 4, 2011

(87) PCT Pub. No.: WO2010/060558
PCT Pub. Date: Jun. 3, 2010

(65) Prior Publication Data
US 2011/0215184 A1 Sep. 8, 2011

(30) Foreign Application Priority Data
Nov. 27, 2008 (DE) .......................... 10 2008 059 387

(51) Int. Cl.
*B65H 75/48* (2006.01)
(52) U.S. Cl.
USPC .................................................. 242/379.1
(58) Field of Classification Search
USPC ......... 242/374, 379, 379.1; 280/806; 297/478
See application file for complete search history.

(56) References Cited

U.S. PATENT DOCUMENTS

| | | | |
|---|---|---|---|
| 5,344,095 A | 9/1994 | Frei et al. | |
| 5,522,564 A | 6/1996 | Schmidt et al. | |
| 5,526,996 A | 6/1996 | Ebner et al. | |
| 5,881,962 A | 3/1999 | Schmidt et al. | |
| 5,924,641 A | 7/1999 | Keller et al. | |
| 6,012,667 A | 1/2000 | Clancy et al. | |
| 6,105,893 A | 8/2000 | Schmidt et al. | |
| 6,105,894 A | 8/2000 | Singer et al. | |
| 6,454,199 B1 * | 9/2002 | Hori et al. | 242/374 |
| 6,592,064 B2 | 7/2003 | Clute et al. | |
| 6,616,081 B1 | 9/2003 | Clute et al. | |
| 7,988,084 B2 * | 8/2011 | Lombarte et al. | 242/374 |
| 2004/0227030 A1 | 11/2004 | Nagata et al. | |
| 2006/0082126 A1 | 4/2006 | Clute | |

(Continued)

FOREIGN PATENT DOCUMENTS

| | | |
|---|---|---|
| DE | 19681341 C1 | 10/1996 |
| DE | 10213906 A1 | 10/2003 |
| DE | 102004011499 A1 | 9/2005 |
| EP | 1721791 A2 | 11/2006 |

(Continued)

*Primary Examiner* — Sang Kim
(74) *Attorney, Agent, or Firm* — Brinks Gilson & Lione

(57) ABSTRACT

A seat belt retractor with a load limiting device and a tensioning device includes a two-part belt shaft with a first part (1), upon which the belt can be wound, and a second part (5), which can be locked in a vehicle-fixed manner in a frame (8) of the seat belt retractor. A tensioner drive wheel (6) for driving the seat belt retractor in the winding direction is located between the first (1) and the second part (5) of the belt shaft on a hollow cylindrical appendix (5*a*) of the second part (5) of the belt shaft, and the load limiting device (3) extends into the ring cylindrical appendix (5*a*) of the second part (5).

6 Claims, 2 Drawing Sheets

(56) References Cited

U.S. PATENT DOCUMENTS

2007/0145174 A1\* 6/2007 Takamatsu et al. ........... 242/374
2007/0241223 A1\* 10/2007 Boelstler et al. .............. 242/374
2007/0262186 A1\* 11/2007 Hiramatsu ................... 242/374

FOREIGN PATENT DOCUMENTS

| EP | 1847424 | B1 | 10/2007 |
| EP | 1964729 | A2 | 9/2008 |
| EP | 1992528 | A2 | 11/2008 |

\* cited by examiner

BELT RETRACTOR HAVING A FORCE LIMITATION DEVICE AND A TIGHTENING DEVICE

TECHNICAL FIELD

The invention relates to a seat belt retractor with a load limiting device and a tensioning device.

BACKGROUND OF THE INVENTION

Seat belt retractors with load limiting devices are generally known and have the function to allow a load limited forward displacement of the passenger during the accident. For this purpose, seat belt retractors of this kind comprise a two-part belt shaft and a load limiting device located between the parts of the belt shaft. In that case, the safety belt restraining the passenger is fastened to one part of the belt shaft, whereas the other part of the belt shaft can be locked in relation to the vehicle-fixed housing of the seat belt retractor. When the seat belt retractor is locked and a force defined by the load limiting device is exceeded, the part of the belt shaft, to which the safety belt is fastened, can rotate in the belt extraction direction, at the same time activating the load limiting device. Thereby, the load acting upon the passenger is limited to the level defined by the load limiting device.

From DE 196 81 341 C1, for example, a seat belt retractor comprising a two-part belt shaft with a torsion bar inserted in between is known. When the belt shaft is locked and the passenger is exposed to a forward displacement, the torsion bar is plastically twisted around its own axis and thus acts as a load limiting device.

Furthermore, seat belt retractors with tensioning devices are generally known, which pull possibly present belt slack out of the safety belt system during an accident, and, thereby, couple the passenger to the vehicle deceleration preferably early.

From DE 102 13 906 A1, a seat belt retractor with a tensioning device located on the locking side of the seat belt retractor is already known. The tensioning device is coupled onto the belt shaft via the locking means of the locking device of the seat belt retractor so that the seat belt retractor has an overall small construction width. The locking of the seat belt retractor is thereby effected via a tensioner drive wheel, which can be fixed in relation to the housing frame. As the tensioner drive wheel includes both the sensor system for activating the locking device and the locking device along with the torsion bar provided as load limiting device, and as the tensioner drive wheel itself must further be designed to be lockable in relation to the housing frame, the tensioner drive wheel has a comparatively complex configuration, wherein the tensioning drive and the locking device including the connected end of the torsion bar are located next to each other.

SUMMARY OF THE INVENTION

It is an object of the invention to provide a seat belt retractor with a load limiting device and a tensioning device, which seat belt retractor shall have a further simplified compact configuration.

According to the invention, a seat belt retractor with a load limiting device and a tensioning device including a two-part belt shaft with a first part, upon which the belt can be wound, and a second part, which can be locked in a vehicle-fixed manner in a frame of the seat belt retractor, and a tensioner drive wheel for driving the seat belt retractor in the winding direction is proposed, wherein the tensioner drive wheel is located between the first and the second part of the belt shaft on a hollow cylindrical appendix of the second part of the belt shaft, and the load limiting device extends into the hollow cylindrical appendix of the second part.

The basic idea of the invention is that the tensioner drive wheel is located between the two parts of the belt shaft, and that a hollow cylindrical appendix is provided on the lockable part of the belt shaft, at which appendix both the tensioner drive wheel and the load limiting device are located. This results in an overall very compact configuration, wherein the construction length of the seat belt retractor is considerably shortened by means of the arrangement of the tensioner drive wheel and by the load limiting device engaging with the hollow cylindrical appendix.

It is further proposed that, on the frame of the seat belt retractor, a housing firmly located on the same is provided, in which housing the tensioner drive wheel is located, and into which housing the lockable part of the belt shaft can be locked. By the proposed housing, the tensioner drive wheel is encapsulated so that the noises and gases occurring during the tensioning process cannot escape in an undamped manner into the vehicle interior, and, at the same time, a structure is provided, into which the seat belt retractor can be locked.

It is further proposed that a second housing is provided on the housing mounting the tensioner drive wheel, in which second housing a control unit for the belt webbing-sensitive and/or vehicle-sensitive control of the locking of the lockable part is provided. The further proposed housing serves for the protection of the control unit and can in addition be used for mounting the seat belt retractor.

A further preferred embodiment of the invention is that the frame of the seat belt retractor has a U-shaped configuration with two brackets opposite to each other, and that openings are provided in the brackets, in which openings the first part of the belt shaft is mounted in an emergency run bearing during the load limited belt webbing extraction movement. By the proposed configuration, an emergency run bearing operative during the load limiting is provided on both sides, by which emergency run bearing a smooth relative rotational movement of the first part of the belt shaft in relation to the second part is secured.

In this case, it is further proposed that the load limiting device is connected in a rotationally fixed manner to the first part of the belt shaft with one end, and that the same engages through one of the openings with the second end. Hereby, on the one hand, longer load limiting devices can be used, and the construction length of the seat belt retractor can be shortened accordingly, even if a longer load limiting device is used. Furthermore, the load limiting device is supported between its ends during the load limiting by being mounted in the opening so that the relative rotational movement of the load limiting device is effected in an essentially better controlled manner.

It is further proposed that the first part of the belt shaft is mounted on the second part via a bearing ring supporting itself on the hollow cylindrical appendix. By the proposed bearing ring and its arrangement, both parts of the belt shaft are mounted towards each other during the tensioning as well as during the load limiting phase, wherein both parts of the belt shaft are mounted directly face-to-face by means of the arrangement of the bearing ring.

A particular compact configuration of the seat belt retractor results from the load limiting device extending into the hollow cylindrical appendix to such an extent that the load limiting device and the tensioner drive wheel overlap in the axial direction.

BRIEF DESCRIPTION OF THE DRAWINGS

In the following, the invention is described in more detail on the basis of a preferred embodiment. In the figures.

DETAILED DESCRIPTION OF THE DRAWINGS

Figure 1:
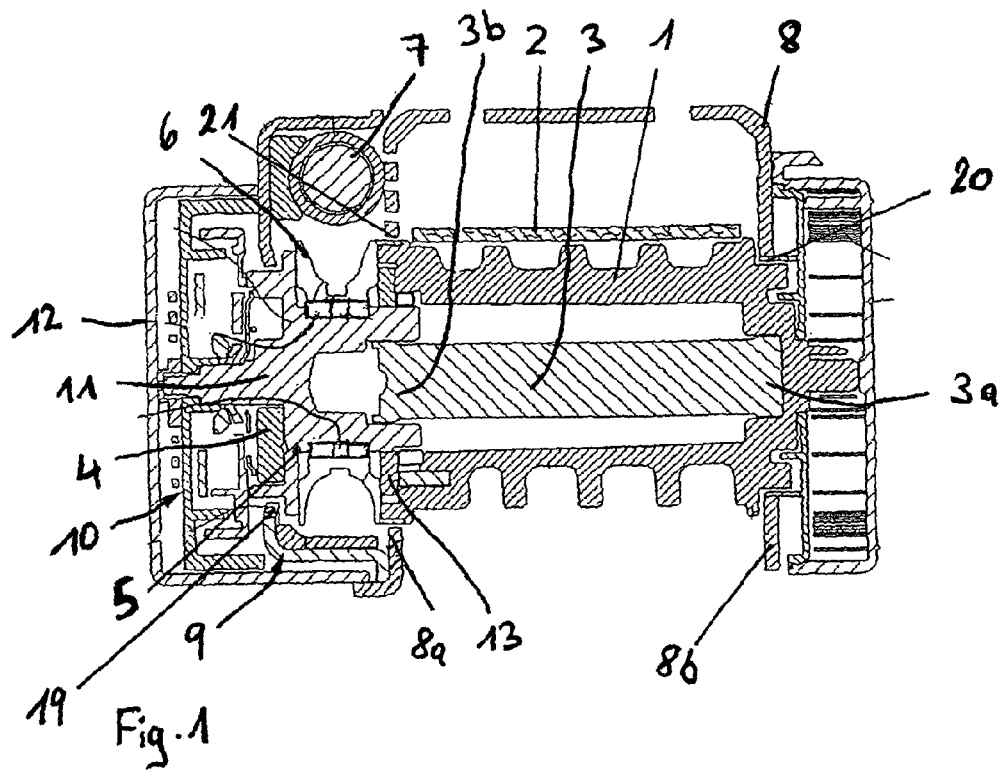
FIG. 1 shows a seat belt retractor with load limiting device and tensioning device.

FIG. 1 shows a seat belt retractor comprising a two-part belt shaft including a first part 1, upon which a safety belt 2 is wound, and a second part 5, which can be locked in a vehicle-fixed manner. The seat belt retractor further includes a U-shaped frame 8 with two brackets 8a and 8b opposite to each other. Openings 21 and 20, respectively, are provided in the brackets 8a and 8b, through which openings the first part 1 of the belt shaft protrudes, and which openings form an emergency run bearing for the first part 1 rotating in the belt webbing extraction direction during the load limited belt webbing extraction movement.

On the second part 5, a locking device 4 in the form of a locking pawl is provided, the movement of which locking device is controlled in a vehicle-sensitive and/or belt webbing-sensitive manner by a control unit 10, as is known. On the second part 5, a hollow cylindrical appendix 5a is further provided, which projects in the direction of the first part 1. A tensioner drive wheel 6 is located on the hollow cylindrical appendix 5a, which tensioner drive wheel can be driven in the winding direction of the seat belt retractor by a drive unit 7. The tensioner drive wheel 6 and the drive unit 7 are at least in sections enclosed by a housing 9, which in addition comprises a toothing 19, with which the locking device 4 engages for locking the second part 5 in a vehicle-fixed manner. As the housing 9 is firmly connected to the frame 8, and as the frame 8 is fastened to the body of the motor vehicle, the second part 5 is locked in a vehicle-fixed manner when the locking device 4 engages with the toothing 19. The housing 9 further has the function to dampen occurring noises and to prevent gases or flames from directly escaping into the vehicle interior.

From the side of the first part 1, a load limiting device 3 in the form of a torsion bar extends into the hollow cylindrical appendix 5a. The torsion bar is connected in a rotationally fixed manner to the first part 1 of the belt shaft with its first end 3a and to the second part 5 of the belt shaft with its second end 3b. When the second part 5 is locked and a belt webbing extraction force predetermined by the load limiting device 3 is exceeded, the first part 1 of the belt shaft starts to rotate in the belt webbing extraction direction. In doing so, the second end 3b is fixed by the second part 5, whereas the first end 3a rotates together with the first part 1 of the belt shaft, and the central section of the torsion bar is plastically twisted between the ends 3a and 3b, at the same time being subjected to plastic deformation. By means of the emergency run bearing of the first part 1 of the belt shaft in the openings 21 and 20, the radial deflection of the first part 1 of the belt shaft during the load limited belt webbing extraction movement and the bending stresses effected in the torsion bar caused by said deflection are reduced to a minimum.

The arrangement according to the invention of the tensioner drive wheel 6 and of the end 3b on one and the same hollow cylindrical appendix 5a results in an overall very compact configuration with very few components. Between the second part 5 and the first part 1 of the belt shaft, a torsion sleeve 14 is further provided, which is dimensioned in such a way that the same transmits the driving torque exerted by the tensioner drive wheel 6 from the second part 5 to the first part 1 of the belt shaft. It is thereby avoided that the driving torque of the tensioning device can lead to a plastic pre-deformation of the torsion bar. Subsequent to the tensioning process or subsequent to a driving torque peak present at the beginning of the tensioning process, the torsion sleeve 14 is destroyed so that the subsequent load limiting phase is not disturbed by the torsion sleeve 14.

Figure 2:
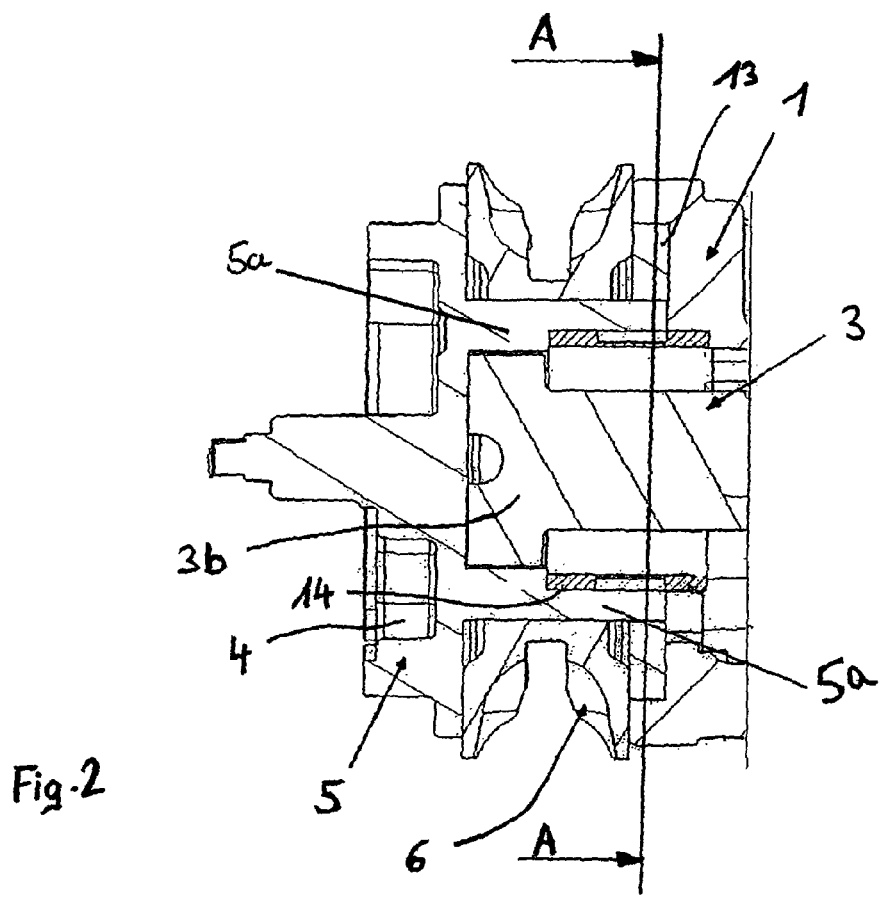
FIG. 2 shows a detail of a seat belt retractor with tensioner drive wheel and load limiting device.
Figure 3:
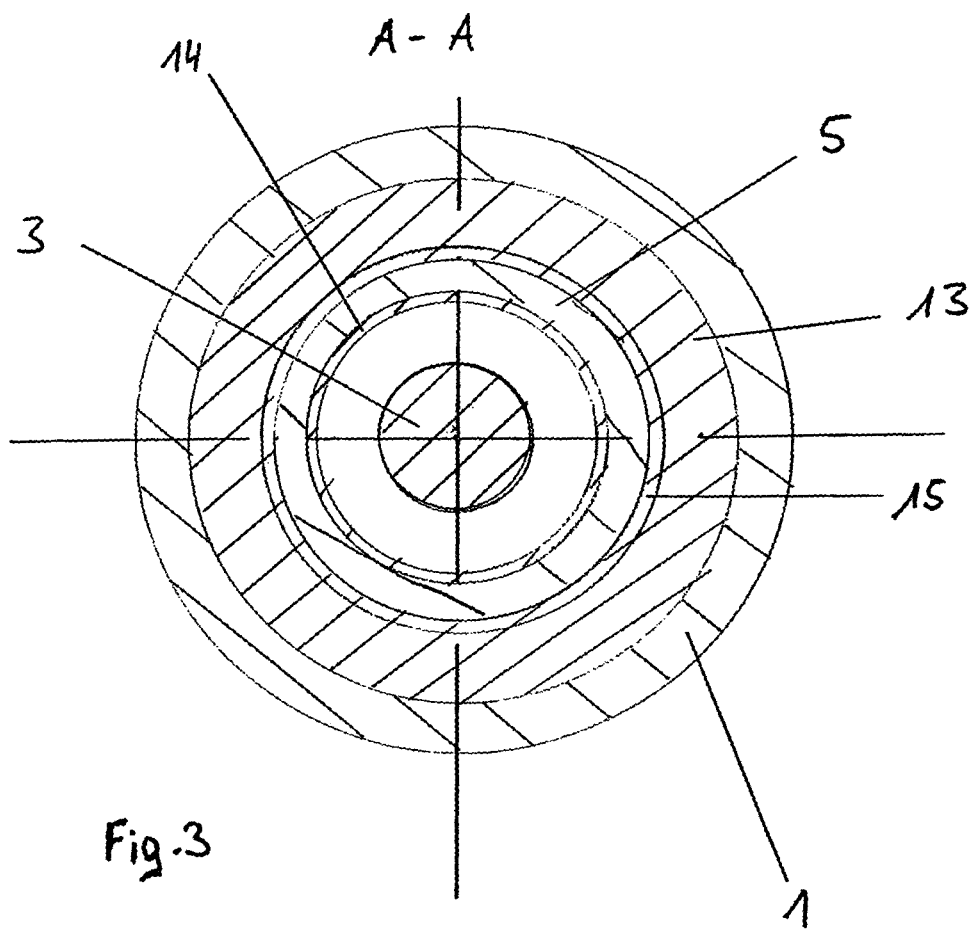
FIG. 3 shows a view according to the cutting direction A-A from FIG. 2.

In the sectional plane A-A from FIG. 2 shown in FIG. 3, the first part 1 of the belt shaft and the hollow cylindrical appendix 5a of the second part 5 overlap in the axial direction. In the overlapping area, a bearing ring 13 is provided, which is fastened in a rotationally fixed manner on the hollow cylindrical appendix 5a via a toothing 15. The overlapping area and, thus, the bearing ring 13 as well are located in the region of the opening 21 of the bracket 8a, as can be seen in FIG. 1, so that possibly occurring radial forces between the second part 5 and the first part 1 of the belt shaft are introduced into the frame 8 of the seat belt retractor as directly as possible. Furthermore, the load limiting device 3 in the form of a torsion bar can be seen in the centre of FIG. 3, which torsion bar projects through the sectional plane A-A defined by the bearing ring 13, as can also be seen in FIG. 2. The mounting of the first part 1 in relation to the second part is thus effected between the ends 3a and 3b of the torsion bar so that the same is preferably well supported during the plastic deformation in the load limiting phase, and the relative rotational movement effecting the plastic deformation of the torsion bar is formed from a pure torsional movement.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A seat belt retractor with a load limiting device and a tensioning device including a two-part belt shaft with a first part configured for winding the belt on the first part, and a second part configured to be locked in a vehicle-fixed manner in a frame of the seat belt retractor, the first part having a first end and a second end, the second part being arranged proximate to the first end of the first part, the first part and the second part being rotationally coupled via the load limiting device, the load limiting device connecting the second end of the first part with the second part, the tensioning device further including a tensioner drive wheel for driving the second part in a direction corresponding to winding the belt onto the first part, the tensioner drive wheel being located axially between the first part and the second part of the belt shaft on a hollow cylindrical appendix of the second part of the belt shaft, the tensioner drive wheel having an axial length, and the load limiting device extending past the first end of the first part into the hollow cylindrical appendix of the second part and axially overlapping in one common axial section with both the tensioner drive wheel and the second part of the belt shaft by more than half of the axial length of the tensioner drive wheel.

2. The seat belt retractor according to claim 1, further comprising a first housing firmly attached to the frame of the seat belt retractor, the housing accommodating the tensioner drive wheel and configured for engagement with the second part of the belt shaft.

3. The seat belt retractor according to claim 2, further comprising a second housing connected to the first housing, the second housing accommodating a control unit for locking the second part.

4. The seat belt retractor according to claim 1, further comprising that the frame of the seat belt retractor has a U-shaped configuration with two brackets opposing each other and with openings forming an emergency run bearing for the first part during a load limited belt webbing extraction.

5. The seat belt retractor according to claim 4, further comprising that the load limiting device has a first end and a second end, the first end being connected in a rotationally fixed manner to the first part of the belt shaft and the second end penetrating one of the openings.

6. The seat belt retractor according to claim 1, further comprising that the first part of the belt shaft is supported on the second part via a bearing ring supporting itself on the hollow cylindrical appendix.

\* \* \* \* \*